(12) United States Patent
Huang et al.

(10) Patent No.: US 10,280,482 B2
(45) Date of Patent: May 7, 2019

(54) METHOD OF RECOVERING RARE EARTH ALUMINUM AND SILICON FROM RARE EARTH-CONTAINING ALUMINUM-SILICON SCRAPS

(71) Applicant: GRIREM ADVANCED MATERIALS CO., LTD., Beijing (CN)

(72) Inventors: Xiaowei Huang, Beijing (CN); Yang Xu, Beijing (CN); Jinyu Wang, Beijing (CN); Liangshi Wang, Beijing (CN); Zongyu Feng, Beijing (CN); Dali Cui, Beijing (CN); Zhiqi Long, Beijing (CN); Xu Sun, Beijing (CN); Na Zhao, Beijing (CN)

(73) Assignee: GRIREM ADVANCED MATERIALS CO., LTD., Beijing (CN)

( * ) Notice: Subject to any disclaimer, the term of this patent is extended or adjusted under 35 U.S.C. 154(b) by 0 days.

(21) Appl. No.: 15/736,874

(22) PCT Filed: Jun. 16, 2016

(86) PCT No.: PCT/CN2016/085976
§ 371 (c)(1),
(2) Date: Dec. 15, 2017

(87) PCT Pub. No.: WO2016/202271
PCT Pub. Date: Dec. 22, 2016

(65) Prior Publication Data
US 2018/0363098 A1 Dec. 20, 2018

(30) Foreign Application Priority Data

Jun. 16, 2015 (CN) .......................... 2015 1 0335198

(51) Int. Cl.
| | | |
|---|---|---|
| C22B 7/00 | (2006.01) | |
| C01F 7/04 | (2006.01) | |
| C01F 7/06 | (2006.01) | |
| C01F 7/22 | (2006.01) | |
| C01F 7/24 | (2006.01) | |
| C01F 7/26 | (2006.01) | |
| C01F 17/00 | (2006.01) | |
| C22B 21/00 | (2006.01) | |
| C22B 59/00 | (2006.01) | |
| C22B 3/44 | (2006.01) | |

(52) U.S. Cl.
CPC ................ *C22B 7/007* (2013.01); *C01F 7/04* (2013.01); *C01F 7/0693* (2013.01); *C01F 7/22* (2013.01); *C01F 7/24* (2013.01); *C01F 7/26* (2013.01); *C01F 17/0006* (2013.01); *C01F 17/0043* (2013.01); *C01F 17/0068* (2013.01); *C01F 17/0075* (2013.01); *C22B 3/44* (2013.01); *C22B 7/00* (2013.01); *C22B 21/0023* (2013.01); *C22B 59/00* (2013.01); *Y02P 10/234* (2015.11)

(58) Field of Classification Search
CPC . C01F 7/04; C22B 7/007; C22B 59/00; C22B 21/00; C01B 33/00
USPC ........................................ 423/21.1, 132, 324
See application file for complete search history.

(56) References Cited

U.S. PATENT DOCUMENTS

| | | | | |
|---|---|---|---|---|
| 8,263,028 B1 * | 9/2012 | Vierheilig | ................ | B01J 29/06 423/21.1 |
| 2010/0003176 A1 * | 1/2010 | Huang | ............... | B01D 11/0288 423/21.1 |
| 2012/0156116 A1 | 6/2012 | Gao et al. | | |

FOREIGN PATENT DOCUMENTS

| | | |
|---|---|---|
| CN | 1045254 A | 9/1990 |
| CN | 1420082 A | 5/2003 |
| CN | 1721559 A | 1/2006 |
| CN | 1817403 A | 8/2006 |
| CN | 1824814 A | 8/2006 |
| CN | 101607725 A | 12/2009 |
| CN | 101705380 A | 5/2010 |
| CN | 101746795 A | 6/2010 |
| CN | 101798627 A | 8/2010 |
| CN | 102127642 A | 7/2011 |

(Continued)

*Primary Examiner* — Steven J Bos
(74) *Attorney, Agent, or Firm* — Shumaker, Loop & Kendrick, LLP; James D. Miller

(57) ABSTRACT

Disclosed is a method of recovering rare earth, aluminum and silicon from rare earth-containing aluminum-silicon scrap. The method comprises: S1, acid-leaching the rare earth-containing aluminum-silicon scrap with an inorganic acid aqueous solution to obtain a silicon-rich slag and acid leached solution containing rare earth and aluminum element; S2, adding an alkaline substance into the acid leached solution containing the rare earth and aluminum element and controlling a PH value of the acid leaching solution between 3.5 to 5.2, performing a solid-liquid separation to obtain a aluminum hydroxide-containing precipitate and a rare earth-containing solution filter; S3, reacting the aluminum hydroxide containing precipitate with sodium hydroxide to obtain sodium metaaluminate solution and aluminum-silicon slag, and preparing a rare earth compound product with the rare earth-containing filtrate. The method dissolves an the aluminum and the rare earth with the acid and then via step wise alkaline conversion, convert aluminum icons to an aluminum hydroxide precipitate separated from rare earth ions, and then adds excessive amounts of sodium hydroxide to convert the aluminum hydroxide to a sodium metaaluminate solution, thereby realizing high-efficiency recovery of both rare earth and aluminum while significantly reducing the consumption of the sodium hydroxide and thus recovery cost.

25 Claims, No Drawings

(56) References Cited

FOREIGN PATENT DOCUMENTS

| | | |
|---|---|---|
| CN | 102190325 A | 9/2011 |
| CN | 102277498 A | 12/2011 |
| CN | 102328942 A | 1/2012 |
| CN | 102417352 A | 4/2012 |
| CN | 103857810 A | 6/2014 |
| CN | 104087757 A | 10/2014 |
| CN | 104928475 A | 9/2015 |
| EP | 2676933 A1 | 12/2013 |
| WO | 2012126092 A1 | 9/2012 |

\* cited by examiner

METHOD OF RECOVERING RARE EARTH ALUMINUM AND SILICON FROM RARE EARTH-CONTAINING ALUMINUM-SILICON SCRAPS

CROSS-REFERENCE TO RELATED PATENT APPLICATIONS

This patent application is a United States national phase patent application based on PCT/CN2016/085976 filed Jun. 16, 2016, which claims the benefit of Chinese Patent Application No. 201510335198.3 filed Jun. 16, 2015, the entire disclosures of which are hereby incorporated herein by reference.

TECHNICAL FIELD

The present invention relates to a field of rare earth recovery, in particular to a method for recovering rare earth, aluminum and silicon from rare earth-containing aluminum silicon scrap.

BACKGROUND

Rare earth is a general term for a total of 17 elements including lanthanide, scandium, and yttrium. The application of rare earth elements is very extensive, rare earth elements can be used to prepare fluorescent materials, rare earth metal hydroxide battery, materials, electric light source materials, permanent magnetic materials and catalytic materials. With the increasing use of rare earth elements in various fields, the consumption of rare earth elements is also increasing.

Rare earth is an indispensable strategic resource for the development of high-tech industries and the transformation of traditional industries, and recovering valuable rare earth elements from scrap residue produced from the rare earth molecular sieve production process, spent oil cracking catalyst (spent FCC catalyst), some other rare earth-containing aluminum scrap, and aluminum silicon scrap has good social and economic benefits. At present, the method of recovering rare earth from these rare earth-containing aluminum silicon scrap mainly includes the following steps: Firstly, the rare earth elements and aluminum elements are extracted to the acid leaching solution by acid-leaching with high concentration strong acid, then aluminum elements form sodium metaaluminate and rare earth elements form hydroxide precipitate by extraction-separation or by adding sodium hydroxide into the acid-leaching solution, so as to achieve the purpose of recovery of rare earth. For example, it is reported that after extraction of rare earth and aluminum with acid, the P507 extractant is directly used to separate rare earth, but under the condition of high-concentration of aluminum ion, the separation coefficient of rare earth is low, and the consumption of acid and alkali is high. In the prior art, the rare earth can be directly recovered with a sulfuric acid method, and the recovery efficiency of rare earth can reach more than 75%. However, in this method, aluminum, silicon and rare earth elements were leached simultaneously extracted into the acid leaching solution during acid leaching process and easily leads to the formation of sol system, consumption of a large amount of strong acid for leaching results in increase of recovery costs, and the resulting too high remaining acid and numerous impurity elements in the leaching solution cause difficulty for subsequent separation.

As can be seen, all the current recovery and treatment methods of rare earth-containing aluminum silicon scrap have the defects of high recovery cost and low recovery efficiency. On this basis, it is necessary to find a low cost and high efficiency recovery and treatment method.

SUMMARY

The main objective of the invention is to provide a method for recovering rare earth, aluminum and silicon from rare earth-containing aluminum silicon scrap, so as to solve the technical problems of high recovery cost and low recovery efficiency in the prior art.

In order to achieve the above objective, in accordance with one aspect of the present invention, a method for recovering rare earth, aluminum and silicon from rare earth-containing aluminum silicon scrap is provided. The method comprises the following steps: S1, acid-leaching rare earth-containing aluminum silicon scrap with an inorganic acid aqueous solution, to obtain an acid leaching solution containing rare earth and aluminum elements as well as a silicon-rich slag; S2, adding an alkaline substance to the acid leaching solution containing rare earth and aluminum elements, controlling an end-point pH value of the acid leaching solution between 3.5 and 5.2 to obtain a slurry, and performing solid-liquid separation for the slurry to obtain an aluminum hydroxide-containing precipitate and a rare earth-containing filtrate; S3, reacting the aluminum hydroxide-containing precipitate with sodium hydroxide to obtain a sodium metaaluminate solution and an aluminum silicon slag; preparing a rare earth compound product with rare earth-containing filtrate.

Further, in the step S1, a pH value of the reaction process is controlled to be 0.1~2.5.

Further, in the step S1, a temperature of acid-leaching is 10~80° C., and an end-point pH value of the acid leaching solution containing rare earth and aluminum obtained is 0.5~2.0.

Further, in the step S1, the inorganic acid aqueous solution is sulfuric acid solution, hydrochloric acid solution or nitric acid solution.

Further, in the step S2, the alkaline substance is added to the acid leaching solution containing rare earth and aluminum in the manner of stirring to perform a precipitation reaction, the precipitation reaction lasts for 0.5~8 h at 10~60° C., and the end-point pH value of the precipitation reaction is 4.0~4.8.

Further, in the step S3, a molar ratio of the sodium hydroxide added to aluminum atoms in the aluminum hydroxide-containing precipitate is 1:1~3:1; and the aluminum hydroxide-containing precipitate is reacted with the sodium hydroxide at 20~120° C. for 0.5~8 h.

Further, in the step S3, preparing the rare earth compound product with the rare earth-containing filtrate comprising: performing extraction-separation for the rare earth-containing filtrate to obtain a rare earth-carried organic phase and a raffinate; performing reverse extraction for the rare earth-carried organic phase with hydrochloric acid or nitric acid to obtain a chloride rare earth solution or a nitric acid rare earth solution; or adding the alkaline substance to the rare earth-containing filtrate, and controlling a pH value of the rare earth-containing filtrate to be 6.0~9.5 to obtain a rare earth precipitate and scrap liquid.

Further, an extractant used in the extraction-separation is P507, P204, or a naphthenic acid; the extractant shall be diluted with a diluent, and the volume content of the extractant in the extractant diluted is 10~60%.

Further, adding the alkaline substance to the rare earth-containing filtrate in a manner of stirring at a temperature of 10~60° C. to react for 0.5~8 h, and controlling the pH value of the rare earth-containing filtrate to be 7.0~9.0 to obtain the rare earth precipitate and the scrap liquid.

Further, the alkaline substance is one or more of an organic alkaline substance or an inorganic alkaline substance; the inorganic alkaline substance is a soluble carbonate, a soluble bicarbonate, a soluble hydroxide or an ammonia water, and preferably the inorganic alkaline substance is at least one of sodium hydroxide, sodium carbonate, and sodium bicarbonate.

Further, when a mass ratio of aluminum to silicon is more than 1:1 in the rare earth-containing aluminum silicon scrap, a step of primary recovery of aluminum in the rare earth-containing aluminum silicon scrap is added before the step S1, and the step of primary recovery comprises: reacting rare earth-containing aluminum silicon scrap with sodium hydroxide, performing solid-liquid separation to obtain a sodium metaaluminate solution and the rare earth-containing aluminum silicon scrap after the primary recovery of aluminum.

Further, according to a molar ratio of 1:1~3:1 for the sodium hydroxide to aluminum atoms in the rare earth-containing aluminum silicon scrap, reacting the rare earth-containing aluminum silicon scrap with sodium hydroxide at 20~120° C. for 0.5~8 h.

In accordance with a further aspect of the present invention, a method for recovering rare earth, aluminum and silicon from rare earth-containing aluminum silicon scrap is further provided. The method comprises: S1, acid-leaching rare earth-containing aluminum silicon scrap with inorganic acid aqueous solution, to obtain a silicon-rich slag and an acid leaching solution containing rare earth and aluminum elements; S2, adding an alkaline substance to the acid leaching solution containing rare earth and aluminum elements, controlling an end-point pH value of the acid leaching solution between 6.0 and 9.5, to obtain a mixed precipitate of rare earth hydroxide and aluminum hydroxide after filtering; and S3, reacting the mixed precipitate of rare earth hydroxide and aluminum hydroxide with sodium hydroxide, to obtain a sodium metaaluminate solution and a rare earth hydroxide precipitate.

Further, in the step S1, a pH value during reaction is controlled to be 0.1~2.5.

Further, in the step S1, a temperature of the acid-leaching is 10~80° C., and an end-point pH value of the acid leaching solution containing rare earth and aluminum obtained is 0.5~2.0.

Further, in the step S1, the inorganic acid aqueous solution is sulfuric acid solution, hydrochloric acid solution or nitric acid solution.

Further, in the step S2, adding the alkaline substance to the acid leaching solution containing rare earth and aluminum elements in the manner of stirring at a temperature of 10~60° C. to react for 0.5~8 h, controlling the end-point pH value of the acid leaching solution between 7.0 and 9.0.

Further, the alkaline substance is one or more of an organic alkaline substance or an inorganic alkaline substance; the inorganic alkaline substance is a soluble carbonate, a soluble bicarbonate, a soluble hydroxide or an ammonia water, and preferably the inorganic alkaline substance is at least one of sodium hydroxide, sodium carbonate, and sodium bicarbonate.

Further, in the step S3, a molar ratio of of the sodium hydroxide added to aluminum atoms in the aluminum hydroxide-containing precipitate is 1:1~3:1; and the aluminum hydroxide-containing precipitate is reacted with the sodium hydroxide at 20~120° C. for 0.5~8 h.

Further, in the step S3, the rare earth hydroxide precipitate is dissolved by hydrochloric acid, nitric acid, or sulfuric acid to obtain a rare earth salt solution, and preferably extraction and purification is performed for the rare earth salt solution.

Further, when the a ratio of aluminum to silicon is more than 1:1 in the rare earth-containing aluminum silicon scrap, a step of primary recovery of aluminum in rare earth-containing aluminum silicon scrap is added before the step S1, and the step of primary recovery comprises: reacting rare earth-containing aluminum silicon scrap with sodium hydroxide, performing solid-liquid separation to obtain a sodium metaaluminate solution and the rare earth-containing aluminum silicon scrap after primary recovery of aluminum.

Further, in the step of primary recovery, according to a molar ratio of 1:1~3:1 for the sodium hydroxide to aluminum atoms in the rare earth-containing aluminum silicon scrap, the rare earth-containing aluminum silicon scrap is reacted with the sodium hydroxide at 20~120° C. for 0.5~8 h.

By applying the technical solution of the invention, the pH value of the acid leaching solution is controlled within the range of 3.5~5.2 by adding an alkaline substance to the acid leaching solution, such that the rare earth ions are still present in the acid leaching solution in the form of ions, while aluminum ions form aluminum hydroxide and are present in the precipitate. This not only realizes effective separation of rare earth elements from aluminum silicon elements, but also reduces the amount of the alkaline substances used. In addition, since a large amount of rare earth-containing filtrate is removed by filtration from the aluminum hydroxide-containing precipitate, i.e., a large amount of aqueous phase solvent is removed by filtration from the acid leaching solution, reacting the aluminum hydroxide-containing precipitate with sodium hydroxide at this time greatly reduces the amount of the sodium hydroxide required for preparation of sodium metaaluminate, thereby the total alkali consumption is reduced by more than 80%, and the recovery cost is reduced.

DETAILED DESCRIPTION OF THE EMBODIMENTS

It should be noted that in the case of no conflict, embodiments in the present application and features in the embodiments can be combined with each other. The present invention will be described in detail in conjunction with embodiments.

As mentioned in the background art, the existing method for recovering rare earth has the defect of high recovery cost. In order to improve the above status, a typical embodiment of the present invention provides a method for recovering rare earth, aluminum and silicon from rare earth-containing aluminum silicon scrap. The method comprises the following steps: S1, acid-leaching rare earth-containing aluminum silicon scrap with inorganic acid aqueous solution, to obtain an acid leaching solution containing rare earth and aluminum as well as a silicon-rich slag; adding an alkaline substance to the acid leaching solution containing rare earth and aluminum, controlling an pH value of the acid leaching solution containing rare earth and aluminum between 3.5 and 5.2 to obtain a slurry, and performing solid-liquid separation for the slurry to obtain an aluminum hydroxide-containing precipitate and a rare earth-containing filtrate; reacting the aluminum hydroxide-containing precipitate with sodium hydroxide to obtain a sodium metaaluminate solution and an aluminum silicon slag; preparing a rare earth compound product with the rare earth-containing filtrate.

In the recovery method provided in the present invention, the inorganic strong acid aqueous solution can convert the rare earth elements and aluminum elements present in a stable solid phase form in the rare earth-containing aluminum silicon scrap into soluble salts which can be dissolved in the acid leaching solution, while the most of the silicon is retained in the slag, so as to realize effective separation of rare earth elements and aluminum elements from silicon elements, and realize effective recovery of silicon. On this basis, the alkaline substance is added to the acid leaching solution, and the pH value of the acid leaching solution is controlled within the range of 3.5~5.2, such that the aluminum ions in the acid leaching solution are converted to aluminum hydroxide precipitate, while the rare earth ions remain in the acid leaching solution, thereby the rare earth ions are separated from aluminum ions; and the resulting aluminum hydroxide-containing precipitate react with sodium hydroxide to form sodium metaaluminate solution, producing a small amount of by-product aluminum silicon slag. The method dissolves an aluminum and rare earth with acid and then via step wise alkaline conversion, convert aluminum icons to an aluminum hydroxide precipitate separated from rare earth ions, and then adds excessive amounts of sodium hydroxide to convert the aluminum hydroxide to a sodium metaaluminate solution, thereby realizing high-efficiency recovery of both rare earth and aluminum while significantly reducing the consumption of the sodium hydroxide and thus reducing the recovery cost.

As compared with the method of directly adding excessive sodium hydroxide to the acid leaching solution to form soluble sodium metaaluminate and rare earth concentrates, the recovery method in the present invention controls the pH value of the acid leaching solution within the range of 3.5~5.2 by adding the alkaline substances to the acid leaching solution, such that rare earth ions are still present in the acid leaching solution in the form of ions, while aluminum ions form aluminum hydroxide present in the precipitate. This not only realizes effective separation of rare earth elements from aluminum silicon elements, but also reduces the usage amount of the alkaline substances. In addition, since a large amount of rare earth-containing filtrate is removed by filtration from the aluminum hydroxide-containing precipitate, i.e., a large amount of aqueous phase solvent is removed by filtration from the acid leaching solution, reacting the aluminum hydroxide-containing precipitate with sodium hydroxide at this time greatly reduces the amount of the sodium hydroxide required for preparation of sodium metaaluminate, thereby the total alkali consumption is reduced by more than 80%, and the recovery cost is reduced.

In addition, as compared with the recovery method of controlling the pH value of the acid leaching solution by adding an alkaline substance to the acid leaching solution, such that aluminum ions form aluminum hydroxide precipitate, while the rare earth ions are still present in the acid leaching solution in the form of ions, the recovery method of the present invention makes the aluminum ions and the rare earth ions form a precipitate mixture by controlling a range of the pH value when the alkaline substance is added; this not only reduces the amount of the alkaline substance used for precipitation, but also filters out a large number of aqueous phases in the resulting precipitate mixture containing aluminum hydroxide and rare earth hydroxide; as long as the subsequently added the sodium hydroxide reacted with the aluminum hydroxide therein, sodium metaaluminate solution can be generated, which further reduces the usage amount of sodium hydroxide, and reduces the total alkali consumption by more than 85%, thereby greatly reduces the cost of recovery.

During the acid-leaching of the above rare earth-containing aluminum silicon scrap, as long as the rare earth elements and the aluminum elements can be converted to soluble salts and separated out, the specific operation process can be adjusted appropriately on the basis of the prior art. In a preferred embodiment of the present invention, in the above step S1, a concentration of hydrogen ion in an inorganic acid aqueous solution added is 1~12 mol/L, and a pH value of the reaction process is controlled to be 0.1~2.5. Controlling the pH value of the reaction process to be 0.1~2.5 is not easy to cause a high acidity locality, and has the effect of high leaching efficiency of the rare earth elements and the aluminum elements, and suppressing the leaching rate of silicon.

In the above acid-leaching, any embodiment beneficial to separation of the rare earth ions and the aluminum ions from scrap is applicable to the present invention. In a preferred embodiment, in the above step S1, the acid leaching reaction is performing by means of agitation leaching or by dump leaching. In actual production, according to the treatment cycle and recovery device of the rare earth-containing aluminum silicon scrap in the enterprises, agitation leaching is helpful for improving leaching rate and speeding up recovery cycle, while dump leaching can reduce the actually occupied area of scrap, and achieve the same effect as agitation leaching under the condition of prolonging the reaction time, and can also reduce the energy consumption in the process of operation.

In a further preferred embodiment of the invention, when the agitation leaching is adopted in the acid leaching reaction, a time of the agitation leaching is 3~12 h; when the dump leaching is adopted in the acid leaching reaction, a time of the dump leaching is 24 h~72 h. Since the agitation leaching has the advantage of high leaching rate, as long as the agitation time is controlled within 3~12 h, the rare earth elements and the aluminum silicon elements in the scrap can be leached out. The leaching rate of the dump leaching is low; therefore, controlling a time of the dump leaching within 24 h~72 h can also leach out the the rare earth elements and the aluminum silicon elements in the scrap.

In the above acid-leaching step, the specific temperature of the acid leaching reaction and the end-point pH value of the reaction shall make the rare earth elements and the aluminum silicon elements in the scrap leach out as much as possible. In a preferred Embodiment of the present invention, a temperature of the above acid leaching reaction is 10~80° C., and an end-point pH value of the acid leaching solution obtained is 0.5~2.0. Controlling of the acid leaching reaction temperature within the range of 10~80° C., and the end-point pH value of the acid leaching reaction, i.e., pH value of the resulting acid leaching solution within the range of 0.5~2.0 has the beneficial effects of high leaching rate of aluminum and rare earth and low leaching 1 efficiency of silicon. More preferably, the temperature of the above acid leaching reaction is 20~40° C.; the end-point pH value of the acid leaching reaction is 0.8~1.5. Under the above conditions of the acid leaching reaction, the leaching rate of aluminum and rare earth can be further improved, and the leaching rate of silicon can be further reduced.

In the above method of the present invention, it is available as long as the inorganic strong acid used during acid-leaching can be reacted with the rare earth elements, the aluminum elements and the silicon elements in the rare earth-containing aluminum silicon scrap to form soluble salt. In a preferred Embodiment, in the above step S1, the inorganic strong acid aqueous solution includes but is not limited to sulfuric acid solution, hydrochloric acid solution or nitric acid solution. More preferably, the inorganic strong acid aqueous solution is a hydrochloric acid solution with a concentration of hydrogen ion of 6~10 mol/L. Compared with the inorganic strong acid solution of other inorganic concentration and other types, the hydrochloric acid solution with a hydrogen ion concentration of 6~10 mol/L has the advantage of improving the leaching rate of the rare earth, especially cerium.

During addition of an alkaline substance to the acid leaching solution for a precipitation reaction, those skilled in the art can achieve the aim of merely making the aluminum ions in the acid leaching solution form precipitate while maintaining the rare earth ions in the solution by adjusting the specific operation process properly on the basis of prior art. In a preferred Embodiment, in the above step S2, an alkaline substance is added to the acid leaching solution in the manner of stirring to perform a precipitation reaction, the precipitation reaction lasts for 0.5~8 h at 10~60° C., and an end-point pH value of the precipitation reaction is 4.0~4.8. After the alkaline substance is added to the acid leaching solution, when the reaction condition of the system is controlled in the above range, the aluminum ions can form precipitate effectively, which is beneficial for separating the rare earth elements from the aluminum elements sufficiently. This not only greatly improves the separation efficiency of the rare earth elements and the aluminum elements, but also facilitates consumption of sodium hydroxide in the recycling of subsequent the aluminum elements by forming the sodium metaaluminate, so as to reduce the cost of recovery.

In a further preferred embodiment of the present invention, in the above step S2, the alkaline substance is added to the acid leaching solution in the manner of stirring to perform a precipitation reaction, the precipitation reaction lasts for 2~4 h at 20~40° C., and the end-point pH value of the precipitation reaction is 4.0~4.8. When the alkaline substance is added to the acid leaching solution in the manner of stirring and the reaction condition of the precipitation reaction system is controlled in the above range, the aluminum ions can form precipitate more effectively, which is beneficial for separating the rare earth elements from the aluminum elements more sufficiently. This is more beneficial for improving the separation efficiency of the rare earth elements and the aluminum elements, effectively avoiding the tedious steps of subsequent separation and reducing the recovery cost.

During the process of reacting the above precipitate containing aluminum hydroxide with the sodium hydroxide, those skilled in the art can reconvert the aluminum elements in the precipitate containing the aluminum hydroxide to soluble sodium metaaluminate by improving the specific operation process properly on the basis of the current process condition. In a preferred Embodiment, in the above step S3, a molar ratio of the sodium hydroxide added to aluminum atoms in the aluminum hydroxide-containing precipitate is 1:1~3:1; and the aluminum hydroxide-containing precipitate is reacted with the sodium hydroxide at 20~120° C. for 0.5~8 h. More preferably, the molar ratio of the sodium hydroxide added to aluminum atoms in the aluminum hydroxide-containing precipitate is 1.5:1~2:1; and the aluminum hydroxide-containing precipitate is reacted with the sodium hydroxide at 50~80° C. for 1~4 h. In the above preferred Embodiment, on the premise of reducing the amount of the alkali used and saving costs, after the precipitate containing aluminum hydroxide is reacted with the sodium hydroxide, controlling the use amount and concentration of the sodium hydroxide in the above range is beneficial to full conversion of the aluminum elements in the precipitate to the sodium metaaluminate.

Using the above methods, the rare earth elements can be effectively separated from the aluminum silicon scrap, and the obtained rare earth-containing filtrate can be used directly as raw rare earth material to prepare single or mixed rare earth compounds. The mixed rare earth compounds refer to mixed salts formed by combining different types of rare earth ions with acid ions of hydrochloric acid or nitric acid, and the single rare earth compounds refer to salts formed by combining a single type of rare earth ions with acid ions of hydrochloric acid or nitric acid.

In a preferred embodiment, in the above step S3, preparation of a substance containing a rare earth compound with the rare earth-containing filtrate comprises: performing extraction separation and purification for the rare earth-containing filtrate to obtain a rare earth-carried organic phase and a raffinate; performing reverse extraction for the rare earth-carried organic phase with hydrochloric acid or nitric acid to obtain a chloride rare earth solution or a nitric acid rare earth solution; or adding an alkaline substance to the rare earth-containing filtrate, and controlling a pH value of the rare earth-containing filtrate to be 7.0~9.0 to obtain a rare earth precipitate and a scrap liquid. According to different purposes, the rare earth-containing filtrate is purified and prepared to various rare earth products as required in application, including rare earth solution or rare earth precipitate, so as to reutilize the rare earth elements. In addition, the raffinate or precipitation scrap can be reused as a slurry-mixing liquid or discharge after it reaches discharge standard upon subsequent treatment.

In the step of obtaining the rare earth chloride solution in an extraction-separation method, the invention preferably uses an acidic phosphorus extractant P507, P204 or naphthenic acid. Before use of the extractant, a step of diluting the extractant with a diluent to obtain a mixed organic phase is further comprised, wherein the diluent is at least one of kerosene, sulfonated kerosene, solvent oil, and alkane, and kerosene, as the diluent, has the advantages of low cost and good two-phase layering, so kerosene is preferred. a Volume content of the extractant in the mixed organic phase is 10%~60%, the volume content of extractant is adjusted according to the content of the rare earth in the filtrate, the higher the content is, the larger the extraction capacity of the rare earth is, the higher the production efficiency is, but if the content of the rare earth is too high, the viscosity will increase, and the two-phase layering will become difficult, increase the difficulty of reverse extraction of the rare earth and increase the consumption of acid. In order to ensure the extraction rate of the rare earth is more than 99%, and consider both efficiency and cost, 30%-50% is preferred. A mixed phase ratio (organic phase O/aqueous phase A, volume ratio) of organic phase to aqueous phase is 0.5-2, an extraction stages are 2-8, and the extraction rate of the rare earth increases with the increase of the phase ratio and the extraction stage, but the extraction efficiency decreases with the decrease of the load concentration of organic-phase rare earth. Reverse extraction is performed for the organic phase of load the rare earth with hydrochloric acid or nitric acid, a concentration of reverse extraction acid used in reverse extraction is controlled to 2-6 mol/L, and a concentration of the rare earth in the resulting reverse extraction liquor reaches 100~300 g/L. In order to improve the reverse extraction rate of the rare earth and reduce the use amount of acid, a 2-8 stage counter current reverse extraction is adopted.

Characteristics of the method to enrich and recovery the rare earth with the acid extractant: 1) since the extraction capabilities of P507, P204 and the like for the rare earth are different from the extraction capabilities of P507, P204 for calcium, magnesium, sodium, and silicon, all the rare earth may be extracted into the organic phase by adjusting the extractant concentration, the extraction phase ratio and the extraction stage, while calcium, magnesium, sodium and other impurities remain in aqueous phase to purify the rear earth. Moreover, when the rare earth concentration is below 15 g/L, non saponifiable P204 can be used directly for the extraction, not requiring ammonia saponification and liquid alkali saponification, which can greatly reduce material consumption, and is environmental friendly; and 2) after extraction and reverse extraction, the low-concentration rare earth can be enriched 20 to 50 times, and the resulting high-concentration rare earth solution is used as a raw material to prepare FCC catalyst or sold as a product, thereby alkaline precipitant is saved, and the cost is greatly reduced.

When the rare earth product is prepared in a method for precipitating the rare earth, the specific technological conditions of the precipitation reaction can be obtained through appropriate adjustment on the basis of the existing process conditions for precipitating the rare earth. In a preferred embodiment of the present invention, the alkaline substance is added to the rare earth-containing filtrate at a temperature of 10~60° C. in the manner of stirring, reacting for 0.5~8 h, and pH value of the reaction process is controlled within 7.0~9.0 to obtain the rare earth precipitate and scrap liquid. Under the above conditions of precipitation reaction, the rare earth retained in the filtrate is converted into rare earth precipitate as much as possible, so as to obtain a high recovery rate of the rare earth. The precipitation method is characterized by simple equipment and low investment.

In a more preferred Embodiment of the present invention, the above step for obtaining the rare earth precipitate comprises: the alkaline substance is added to the rare earth-containing filtrate at the temperature of 20~40° C. in the manner of stirring, reacting for 1~2 h, and the pH value of the reaction process is controlled within 7.0~9.0 to obtain the rare earth precipitate and scrap liquid. The resulting recovery rate of the rare earth in the rare earth precipitate is higher under the above process conditions.

Similarly, the above step for precipitating the rare earth has no special requirement for specific types of the alkaline substances added: both organic alkali and inorganic alkali are applicable to the invention, and it is available as long as the one or more alkaline substances added can precipitate the rare earth elements in the filtrate. In the present invention, the inorganic alkaline substance added is preferably soluble carbonate, soluble bicarbonate, soluble hydroxide, or ammonia.

The above method of the present invention is applicable to any rare earth-containing aluminum silicon scrap, preferably these rare earth-containing aluminum silicon scraps include but are not limited to scrap residue produced in the production of rare earth molecular sieves, spent FCC catalyst, automobile exhaust catalyst, and special ceramic scrap containing the rare earth. In a further preferred embodiment of the present invention, when a mass ratio of aluminum to silicon is more than 1:1 in the rare earth-containing aluminum silicon scrap, before the step S1, the above method further comprises a step of primary recovery of aluminum in rare earth-containing aluminum silicon scrap is added, and the step of primary recovery comprises: reacting the rare earth-containing aluminum silicon scrap with sodium hydroxide to obtain a sodium metaaluminate solution and the rare earth-containing aluminum silicon scrap after the primary recovery of aluminum, wherein a recovery rate of the aluminum in the primary recovery step is 30~80%.

The sodium hydroxide aqueous solution can convert the aluminum elements and small amounts of silicon elements present in the form of stabilized solid phase in the rare earth-containing aluminum silicon scrap to soluble salts which dissolved in the alkali leaching solution, while the rare earth remains in the solid phase slag. On this basis, inorganic strong acid aqueous solution is added to the slag containing the rare earth, the rare earth in the slag containing the rare earth can be dissolved in the solution through the reaction, and most the silicon elements are further separated in the form of solid phase. Therefore, the above preferred embodiment realizes primary recovery of the aluminum by forming soluble aluminum-containing solution with the aluminum element in the rare earth-containing aluminum silicon scrap and the sodium hydroxide, while maintaining the rare earth elements in the scrap after the recovery of aluminum. Valuable sodium metaaluminate solution is obtained from a large amount of the aluminum in the silicon aluminum scrap through alkali leaching filtration, since when inorganic strong acid is added to the rare earth-containing aluminum silicon scrap after the recovery of the aluminum to carry out dissolution, both the acid consumed for dissolving the aluminum and the aluminum in the rare earth leaching solution can be greatly reduced, the subsequent difficulty of separating the rare earth from the aluminum can be simplified, so as to significantly reduce the unit consumption of chemical materials and the recovery costs.

In the above preferred embodiment, reacting the rare earth-containing aluminum silicon scrap with the sodium hydroxide can convert most the aluminum elements to the soluble salts, so as to separate the aluminum elements primarily. In the above step of the primary recovery of the aluminum, those skilled in the art can select specific operation process rationally based on the prior art to convert the aluminum elements to the soluble salts and separate them out. In a preferred Embodiment, according to a molar ratio of 1:1~3:1 for sodium hydroxide to aluminum atoms in the rare earth-containing aluminum silicon scrap, the rare earth-containing aluminum silicon scrap is reacted with the sodium hydroxide at 20~120° C. for 0.5~8 h to obtain a mixture of the sodium metaaluminate solution and a filter residue containing rare earth. During the above the primary recovery of the aluminum elements, reacting for the above time period at the above temperature with the sodium hydroxide of the above proportion is helpful for full reaction of the aluminum elements to form the sodium metaaluminate dissolved in liquid phase, so as to facilitate further separation of the aluminum elements from the rare earth elements.

In a more preferred embodiment of the present invention, according to the molar ratio 1.5:1~2:1 of the sodium hydroxide to the aluminum atoms in the rare earth-containing aluminum silicon scrap, react the rare earth-containing aluminum silicon scrap with the sodium hydroxide at 50~80° C. for 1~4 h to obtain the mixture of the sodium metaaluminate solution and of the filter residue containing rare earth. Setting the process parameters for the primary recovery step of the aluminum elements in the above range is helpful for considering both the recovery cost of the rare earth and the recovery rate. During the process of reacting the rare earth-containing aluminum silicon scrap with the sodium hydroxide, it is preferred that the aluminum elements are fully leached by mechanical agitation, such that the subsequent separation of the rare earth elements from the aluminum elements becomes easy.

In the above method, performing strong acid-leaching for the rare earth-containing aluminum silicon scrap can convert most the rare earth elements to soluble salts, so as to separate the rare earth elements. In order to further improve the recovery efficiency of the rare earth elements and the aluminum elements in the rare earth-containing aluminum silicon scrap, in a preferred embodiment of the present invention, before the above step S1, there is also a step of pretreatment of the rare earth-containing aluminum silicon scrap; the pretreatment step includes one or more of crushing, grinding, washing and heat treatment.

Heat treatment can remove the residual organic matter in the scrap and make the rare earth elements easily leach out during the later acid-leaching process. In addition, the condition of heat treatment is beneficial to change the structure of the scrap, make the rare earth elements easily leach out, and then help to improve the recovery rate of the rare earth elements. Crushing and grinding can increase the contact area between the aluminum silicon scrap and the inorganic strong acid solution, thereby increasing the leaching speed of the rare earth elements in the scrap. Washing is beneficial to removing impurities carried on the scrap surface, thus preventing the impurities from entering the acid leaching solution to affect the purity of the final rare earth concentrate. Preferably, in the washing step, detergent is a surfactant aqueous solution, wherein the surfactant aqueous solution includes but is not limited to anionic linear alkyl benzene sulfonate, nonionic surfactant or $Na_2SO_3$; preferably, in the heat treatment step, a heat treatment temperature is 200~550° C., a heat treatment time is 0.5~4 h; preferably, in the crushing or grinding process, the above aluminum silicon scrap is processed as particles with a diameter of 10 µm~2 mm.

In the above step S1, performing inorganic strong acid leaching for the rare earth-containing aluminum silicon scrap can convert most rare earth elements to soluble salts, so as to separate the rare earth elements. In order to further improve the leaching rate of the rare earth elements and the aluminum elements, in a preferred embodiment of the present invention, before the acid leaching reaction of the rare earth-containing aluminum silicon scrap is carried out with the inorganic strong acid aqueous solution, there is also a step of mixing slurry of the rare earth-containing aluminum silicon scrap to obtain a solid-liquid mixed slurry. Slurry mixing is firstly performed for the rare earth-containing aluminum silicon scrap, such that partial soluble substances in the scrap are reacted with the inorganic strong acid in the form of a solution, which is helpful for improving the acid leaching rate and efficiency. In a further more preferred embodiment of the present invention, a liquid solid ratio of the solid-liquid mixed slurry obtained from slurry mixing is 3.0~6.0 L:1 kg. Controlling the liquid solid ratio of the solid-liquid mixed slurry within the range 3.0~6.0 L:1 kg enables a high acid leaching rate and a high leaching effect of the rare earth and aluminum ions.

In a further typical embodiment of the present invention, a method for recovering rare earth, aluminum and silicon from rare earth-containing aluminum silicon scrap is further provided. The method comprises the following steps: S1, acid-leaching the rare earth-containing aluminum silicon scrap with an inorganic acid aqueous solution, to obtain a silicon-rich slag and an acid leaching solution containing rare earth and aluminum elements; S2, adding an alkaline substance to the acid leaching solution containing rare earth and aluminum elements, controlling an end-point pH value of the acid leaching solution between 6.0 and 9.5, filtering to obtain a mixed precipitate of rare earth hydroxide and aluminum hydroxide; and S3, reacting the mixed precipitate of rare earth hydroxide and aluminum hydroxide with sodium hydroxide, to obtain sodium metaaluminate solution and rare earth hydroxide precipitate.

In the above method of recovering the rare earth, the aluminum and the silicon from the rare earth-containing aluminum silicon scrap, the alkaline substances are added to the acid leaching solution and the end-point pH value are controlled within the range of 6.0~9.5, such that the rare earth and aluminum precipitate together to form a mixed precipitate together, and then the alkali is added to dissolve the aluminum to form the sodium metaaluminate solution, so as to realize recovery and utilization of the aluminum, while the rare earth is still present in the form of precipitation, thereby realizing separation and recovery of the rare earth and the aluminum. In the above method, recovery of the silicon, the aluminum, and the rare earth is realized by precipitating the aluminum and the rare earth together and then separating the aluminum from of the precipitate. As compared with the method of adding excessive sodium hydroxide directly into the acid leaching solution to form the soluble sodium metaaluminate and rare earth concentrates, the above method also achieves the aim of reducing the total alkali consumption, and thereby reducing the recovery cost.

During the acid-leaching of the above rare earth-containing aluminum silicon scrap, as long as the rare earth elements and the aluminum elements can be converted to soluble salts and separated, the specific operation process can be adjusted appropriately on the basis of the prior art. In a preferred Embodiment of the present invention, in the above step S1, a pH value of the reaction process is controlled to be 0.1~2.5. Controlling the pH value of the reaction process to 0.1~2.5 is not easy to cause a too high local acidity, and has the effect of high leaching rate of the rare earth elements and the aluminum elements, and suppressing the leaching rate of silicon.

In the above acid-leaching, the specific temperature of the acid leaching reaction and the end-point pH value of the reaction shall make the rare earth elements and the aluminum silicon elements in the scrap leached out as much as possible. In a preferred Embodiment of the present invention, a temperature of the above acid leaching reaction is 10~80° C., and an end-point pH value of the acid leaching solution obtained is 0.5~2.0. Control of acid leaching reaction temperature within the range of 10~80° C., and the end-point pH value of the acid leaching reaction, i.e., pH value of the resulting acid leaching solution within the range of 0.5~2.0 has the beneficial effects of high leaching rate of the aluminum and the rare earth and low leaching rate of the silicon. More preferably, the temperature of the above acid leaching reaction is 20~40° C.; the end-point pH value of the acid leaching reaction are 0.8~1.5. Under the above conditions of the acid leaching reaction, the leaching rate of the aluminum and the rare earth can be further improved, and the leaching rate of the silicon can be further reduced.

In the above method of the present invention, it is available as long as the inorganic strong acid used in the acid-leaching can react with the rare earth elements, the aluminum elements and the silicon elements in the rare earth-containing aluminum silicon scrap to form soluble salt. In a preferred Embodiment, in the above step S1, the aqueous solution of inorganic strong acid includes but is not limited to sulfuric acid solution, hydrochloric acid solution or nitric acid solution. More preferably, the inorganic strong acid aqueous solution is a hydrochloric acid solution with a concentration of hydrogen ion of 6~10 mol/L. Compared with the inorganic strong acid solution of other inorganic concentration and other types, the hydrochloric acid solution with a hydrogen ion concentration of 6~10 mol/L has the advantage of improving the leaching rate of the rare earth, especially cerium.

During the addition of the alkaline substance to the acid leaching solution for a precipitation reaction, those skilled in the art can achieve the aim of precipitating both the aluminum ions and the rare earth ions in the acid leaching solution by adjusting the specific operation process properly on the basis of prior art. In a preferred Embodiment, in the above step S2, the alkaline substance is added to the acid leaching solution containing rare earth and aluminum elements at a temperature of 10~60° C. in the manner of stirring, reacting for 0.5~8 h, and the pH value of the reaction process is controlled within 7.0~9.0 to obtain a mixed precipitate of the rare earth hydroxide and the aluminum hydroxide through filtering. When the reaction conditions of the system are controlled in the above range, the aluminum ions and the rare earth ions can form precipitate effectively to facilitate the subsequent recovery and utilization of the sodium metaaluminate formed from the aluminum in the form of precipitation by merely adding appropriate amount of the sodium hydroxide, thereby reducing consumption of the sodium hydroxide and reducing the recovery costs.

The above step has no special requirement for specific types of the alkaline substances added: both organic alkali and inorganic alkali are applicable to the invention, and it is available as long as the one or more alkaline substances added can precipitate the rare earth elements and the aluminum elements in the acid leaching solution. In the present invention, the inorganic alkaline substance added is preferably soluble carbonate, soluble bicarbonate, soluble hydroxide, or ammonia; more preferably, the inorganic alkaline substance is at least one of sodium hydroxide, sodium carbonate and sodium bicarbonate.

During the above reaction between the mixed precipitate of the rare earth hydroxide and the aluminum hydroxide with sodium hydroxide, those skilled in the art can achieve the aim of preparing the sodium metaaluminate solution and the rare earth hydroxide precipitate by adjusting the specific operation process properly on the basis of prior art. In a preferred embodiment, in the above step S3, a molar ratio of the sodium hydroxide added to aluminum atoms in the aluminum hydroxide-containing precipitate is 1:1~3:1; and the aluminum hydroxide-containing precipitate react with the sodium hydroxide at 20~120° C. for 0.5~8 h.

Further, in the step S3, the rare earth hydroxide precipitate is dissolved by hydrochloric acid, nitric acid, or sulfuric acid to obtain the rare earth salt solution, the obtained rare earth salt solution may be mixed with some impurity salts, so in order to further improve the purity of rare earth products, preferably extraction purification is performed for the rare earth salt solution.

The above method of the present invention is applicable to any rare earth-containing aluminum silicon scrap, preferably these rare earth-containing aluminum silicon scraps include but are not limited to scrap residue produced in the production of rare earth molecular sieves, spent FCC catalyst, automobile exhaust catalyst, and special ceramic scrap containing the rare earth. In a further preferred embodiment of the present invention, when a mass ratio of the aluminum to the silicon is more than 1:1 in the rare earth-containing aluminum silicon scrap, before the step S1, the above method further comprises a step of primary recovery of aluminum in the rare earth-containing aluminum silicon scrap is added, and the step of primary recovery comprises: reacting the rare earth-containing aluminum silicon scrap with sodium hydroxide to a obtain sodium metaaluminate solution and the rare earth-containing aluminum silicon scrap after the primary recovery of aluminum, wherein the recovery rate of the aluminum in the primary recovery step is 30~80%.

The sodium hydroxide aqueous solution can convert the aluminum elements and small amounts of silicon elements present in the form of stabilized solid phase in the rare earth-containing aluminum silicon scrap to soluble salts which dissolved in the alkali leaching solution, while the rare earth remains in the scrap after the primary recovery of the aluminum. On this basis, inorganic strong acid aqueous solution is added to the rare earth-containing scrap after the primary recovery of aluminum, the rare earth in the slag containing the rare earth can be dissolved in the solution through the reaction, and most silicon elements are further separated in the form of solid phase for recovery and utilization. Therefore, the above preferred embodiment realizes primary recovery of the aluminum by forming soluble aluminum-containing solution with the aluminum element in the rare earth-containing aluminum silicon scrap and the sodium hydroxide, while maintaining the rare earth elements in the scrap after the recovery of the aluminum. Valuable sodium metaaluminate solution is obtained from a large amount of the aluminum in the silicon aluminum scrap through alkali leaching filtration, since when inorganic strong acid is added to the rare earth-containing aluminum silicon scrap after the recovery of the aluminum to carry out dissolution, both the acid consumed for dissolving the aluminum and the aluminum in the rare earth leaching solution can be greatly reduced, the subsequent difficulty of separating the rare earth from the aluminum can be simplified, so as to significantly reduce the unit consumption of chemical materials and the recovery costs.

In the above preferred embodiment, reacting the rare earth-containing aluminum silicon scrap with the sodium hydroxide can convert most aluminum elements to soluble salts, so as to separate the aluminum elements primarily. In the above step of the primary recovery of the aluminum, those skilled in the art can select specific operation process rationally based on the prior art to convert the aluminum elements to the soluble salts and separate them. In a preferred Embodiment in the step of the primary recovery, according to a molar ratio 1:1~3:1 of the sodium hydroxide to the aluminum atoms in the rare earth-containing aluminum silicon scrap, the rare earth-containing aluminum silicon scrap reacted with the sodium hydroxide at 20~120° C. for 0.5~8 h to obtain a mixture the sodium metaaluminate solution and a filter residue containing rare earth. During the above primary recovery of the aluminum elements, reacting for the above time period at the above temperature with the sodium hydroxide of the above proportion is helpful for full reaction of the aluminum elements to form the sodium metaaluminate dissolved in liquid phase, so as to facilitate further separation of the aluminum elements from rare earth elements.

The present invention is further described in detail with specific embodiments, which are not understood to limit the scope of the protection claimed by the present invention.

Embodiments 1-12 relate to steps of acid-leaching of the rare earth-containing aluminum silicon scrap in the inorganic acid aqueous solution, wherein dominant ingredients in the rare earth-containing aluminum silicon scrap are shown in Table 1 below:

| Ingredient | $Al_2O_3$ | REO | $SiO_2$ | CaO |
|---|---|---|---|---|
| Content wt % | 16 | 10 | 55 | 5 |

Embodiment 1

The rare earth-containing aluminum silicon scrap is stirred into a slurry with a liquid-solid ratio of 3:1, 1 mol/L hydrochloric acid is added to process the rare earth-containing aluminum silicon scrap, the pH value during the reaction process is controlled to be 2.5, mechanical agitation (200 rad/min) leaching is performed at 10° C. for 12 h, pH value of the solution at the end of the reaction is controlled to be 2.0; an acid leaching solution containing rare earth and aluminum and a silicon-rich slag are obtained after filtration. Leaching efficiency (all calculated by oxide) of the aluminum, the rare earth and the silicon in the acid leaching solution containing rare earth and aluminum are 66.9%, 85.3%, and 3.5%, respectively.

Comparison 1

The rare earth-containing aluminum silicon scrap is stirred into a slurry with a liquid-solid ratio of 3:1.1 mol/L hydrochloric acid is added to process the rare earth-containing aluminum silicon scrap, the pH value during the reaction process is controlled to be 3.0, mechanical agitation (200 rad/min) leaching is performed at 10° C. for 12 h, pH value of the solution at the end of the reaction is controlled to be 2.8; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 60.3%, 77.8%, and 3.3%, respectively.

Embodiment 2

Before acid leaching reaction, the rare earth-containing aluminum silicon scrap is firstly crushed, ground and stirred into a slurry with a liquid-solid ratio of 4:1. 3 mol/L hydrochloric acid is added to process the rare earth-containing aluminum silicon scrap, the pH value during the reaction process is controlled to be 2.0, mechanical agitation (180 rad/min) leaching is performed at 20° C. for 8 h, pH value of the solution at the end of the reaction is controlled to be 1.8; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 73.6%, 89.2%, and 4.2% respectively.

Embodiment 3

The rare earth-containing aluminum silicon scrap is stirred into a slurry with a liquid-solid ratio of 5:1. 5 mol/L hydrochloric acid is added to process the rare earth-containing aluminum silicon scrap, the pH value during the reaction process is controlled to be 1.8, mechanical agitation (220 rad/min) leaching is performed at 40° C. for 6 h, pH value of the solution at the end of the reaction is controlled to be 1.5; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 77.2%, 91.5%, and 4.5% respectively.

Embodiment 4

The rare earth-containing aluminum silicon scrap is stirred into a slurry with a liquid-solid ratio of 6:1. 7 mol/L hydrochloric acid is added to process the rare earth-containing aluminum silicon scrap, the pH value during the reaction process is controlled to be 1.5, mechanical agitation (200 rad/min) leaching is performed at 80° C. for 4 h, pH value of the solution at the end of the reaction is controlled to be 1.2; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 82.1%, 93.6%, and 5.5% respectively.

Embodiment 5

The rare earth-containing aluminum silicon scrap is stirred into a slurry with a liquid-solid ratio of 5:1. 9.5 mol/L hydrochloric acid is added to process the rare earth-containing aluminum silicon scrap, the pH value during the reaction process is controlled to be 1.5, mechanical agitation (240 rad/min) leaching is performed at 25° C. for 4 h, pH value of the solution at the end of the reaction is controlled to be 1.2; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 80.7%, 92.1%, and 5.0% respectively.

Embodiment 6

The rare earth-containing aluminum silicon scrap is stirred into a slurry with a silicon-rich slag washing water (the liquid-solid ratio is 2.5:1). 9.5 mol/L hydrochloric acid is added to process the rare earth-containing aluminum silicon scrap, the pH value during the reaction process is controlled to be 1.0, mechanical agitation (200 rad/min) leaching is performed at 25° C. for 4 h, pH value of the solution at the end of the reaction is controlled to be 0.8; an acid leaching solution containing rare earth and aluminum and a silicon-rich slag are obtained through filtration. The silicon-rich slag is washed twice against the current with water (liquid solid ratio 3:1). Leaching rates (all calculated by oxide) of the aluminum, the rare earth and the silicon in the acid leaching solution containing rare earth and aluminum are 85.8%, 95.9%, and 5.8% respectively.

Embodiment 7

The rare earth-containing aluminum silicon scrap is stirred into a slurry with a liquid-solid ratio of 5:1. 12 mol/L hydrochloric acid is added to process the rare earth-containing aluminum silicon scrap, the pH value during the reaction process is controlled to be 0.8, mechanical agitation (150 rad/min) leaching is performed at 25° C. for 4 h, pH value of the solution at the end of the reaction is controlled to be 0.5; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 86.7%, 97.5%, and 5.9% respectively.

Embodiment 8

The rare earth-containing aluminum silicon scrap is stirred into a slurry with a liquid-solid ratio of 4:1. 10 mol/L hydrochloric acid is added to process the rare earth-containing aluminum silicon scrap, the pH value during the reaction process is controlled to be 0.1, mechanical agitation (180 rad/min) leaching is performed at 25° C. for 4 h, pH value of the solution at the end of the reaction is controlled to be 0.1; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 86.9%, 97.6%, and 8.2% respectively.

Embodiment 9

The rare earth-containing aluminum silicon scrap is stirred into a slurry with a liquid-solid ratio of 4:1. hydrochloric acid is added to process the rare earth-containing aluminum silicon scrap, the concentration of hydrogen ion in hydrochloric acid is 6 mol/L, the pH value during the reaction process is controlled to be 2.5, dump leaching is performed at 25° C. for 72 h, pH value of the solution at the end of the reaction is controlled to be 2.0; an acid leaching solution and a silicon-rich slag are obtained through filtration. Leaching rates (all calculated by oxide) of dump aluminum, r dump are earth and dump silicon in the acid leaching solution are 69.4%, 88.2%, and 3.2% respectively.

Embodiment 10

The rare earth-containing aluminum silicon scrap is stirred into a slurry with a liquid-solid ratio of 5:1. hydrochloric acid is added to process the rare earth-containing aluminum silicon scrap, the concentration of hydrogen ion in hydrochloric acid is 8 mol/L, the pH value during the reaction process is controlled to be 1.8, dump leaching is performed at 25° C. for 24 h, pH value of the solution at the end of the reaction is controlled to be 1.5; an acid leaching solution and a silicon-rich slag are obtained through filtration. Leaching rates (all calculated by oxide) of the aluminum, the rare earth and the silicon in the acid leaching solution are 67.7%, 84.6%, and 4.0% respectively.

Embodiment 11

The rare earth-containing aluminum silicon scrap is stirred into a slurry with a liquid-solid ratio of 5:1. 10 mol/L nitric acid is added to process the rare earth-containing aluminum silicon scrap, the pH value during the reaction process is controlled to be 1.5, mechanical agitation (180 rad/min) leaching is performed at 30° C. for 6 h, pH value of the solution at the end of the reaction is controlled to be 1.2; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 85.2%, 96.7%, and 7.2% respectively.

Embodiment 12

The rare earth-containing aluminum silicon scrap is stirred into a slurry with a liquid-solid ratio of 4:1. 12 mol/L hydrochloric acid is added to process the rare earth-containing aluminum silicon scrap, the pH value during the reaction process is controlled to be 1.2, mechanical agitation (200 rad/min) leaching is performed at 30° C. for 4 h, pH value of the solution at the end of the reaction is controlled to be 1.0; an acid leaching solution containing rare earth and aluminum and a silicon-rich slag are obtained through filtration. Leaching rates (all calculated by oxide) of the aluminum, the rare earth and the silicon in the acid leaching solution containing rare earth and aluminum are 82.6%, 60.4%, and 8.1% respectively.

Embodiment 13 relates to steps of another acid leaching of a further rare earth-containing aluminum silicon scrap in an inorganic strong acid aqueous solution, wherein dominant ingredients in the rare earth-containing aluminum silicon scrap are shown in Table 1 below:

| Ingredient | $Al_2O_3$ | REO | $SiO_2$ | CaO |
|---|---|---|---|---|
| Content wt % | 22 | 8 | 68 | 0.1 |

Embodiment 13

The rare earth-containing aluminum silicon scrap is stirred into a slurry with a liquid-solid ratio of 4:1. 9.5 mol/L hydrochloric acid is added to process the rare earth-containing aluminum silicon scrap, the pH value during the reaction process is controlled to be 1.8, mechanical agitation (200 rad/min) leaching is performed at 30° C. for 4 h, pH value of the solution at the end of the reaction is controlled to be 1.5; an acid leaching solution containing rare earth and aluminum and a silicon-rich slag are obtained through filtration. Leaching rates (all calculated by oxide) of the aluminum, r the are earth and the silicon in the acid leaching solution containing rare earth and aluminum are 98.2%, 99.1%, and 1.5% respectively.

Embodiments 14-21 relate to the steps of adding an alkaline substance to the acid leaching solution to form precipitate.

Embodiment 14

The acid leaching solution obtained from Embodiment 6 is used as a raw material, sodium hydroxide is added to make pH value of the solution is 3.5, the reaction temperature is 10° C., and the reaction time is 0.5 h. After filtration, an aluminum hydroxide-containing precipitate and a rare earth-containing filtrate are obtained respectively. During this process, the precipitation rates of the aluminum and the rare earth are 90.3% and 1.3% respectively.

Comparison 2

The acid leaching solution obtained from Embodiment 6 is used as a raw material, sodium hydroxide is added to make pH value of the solution is 3.0, the reaction temperature is 10° C., and the reaction time is 0.5 h. After filtration, an aluminum hydroxide-containing precipitate and a rare earth-containing filtrate are obtained respectively. During this process, the precipitation rates of the aluminum and the rare earth are 81.7% and 1.1% respectively.

Embodiment 15

The acid leaching solution obtained from Embodiment 6 is used as a raw material, sodium hydroxide is added to market pH value of the solution is 4.0, the reaction temperature is 20° C., and the reaction time is 2 h. After filtration, an aluminum hydroxide-containing precipitate and a rare earth-containing filtrate are obtained respectively. During this process, the precipitation rates of the aluminum and the rare earth are 94.6% and 2.1% respectively.

Embodiment 16

The acid leaching solution obtained from Embodiment 6 is used as a raw material, sodium hydroxide is added to make pH value of the solution is 4.5, the reaction temperature is 40° C., and the reaction time is 4 h. After filtration, an aluminum hydroxide-containing precipitate and a rare earth-containing filtrate are obtained respectively. During this process, the precipitation rates of the aluminum and the rare earth are 99.0% and 3.3% respectively.

Embodiment 17

The acid leaching solution obtained from Embodiment 6 is used as a raw material, sodium hydroxide is added to make pH value of the solution is 4.6, the reaction temperature is 25° C., and the reaction time is 4 h. After filtration, an aluminum hydroxide-containing precipitate and a rare earth-containing filtrate are obtained respectively. During this process, the precipitation rates of the aluminum and the rare earth are 99.1% and 4.2% respectively.

Embodiment 18

The acid leaching solution obtained from Embodiment 6 is used as a raw material, sodium hydroxide is added to make pH value of the solution is 4.8, the reaction temperature is 25° C., and the reaction time is 4 h. After filtration, an aluminum hydroxide-containing precipitate and a rare earth-containing filtrate are obtained respectively. During this process, the precipitation rates of the aluminum and the rare earth are 99.2% and 5.0% respectively.

Embodiment 19

The acid leaching solution obtained from Embodiment 6 is used as a raw material, sodium hydroxide is added to make pH value of the solution is 5.2, the reaction temperature is 60° C., and the reaction time is 6 h. After filtration, an aluminum hydroxide-containing precipitate and a rare earth-containing filtrate are obtained respectively, the aluminum hydroxide-containing precipitate is washed twice against the current with water (liquid solid ratio 1.5:1), and the washing water is combined with the filtrate. During this process, the precipitation rates of the aluminum and the rare earth are 99.4% and 8.3% respectively.

Comparison 3

The acid leaching solution obtained from Embodiment 6 is used as a raw material, sodium hydroxide is added to make t pH value of the solution is 6.0, the reaction temperature is 60° C., and the reaction time is 6 h. After filtration, an aluminum hydroxide-containing precipitate and a rare earth-containing filtrate are obtained respectively. During this process, the precipitation rates of the aluminum and the rare earth are 99.5% and 15.1% respectively.

Embodiment 20

The acid leaching solution obtained from Embodiment 6 is used as a raw material, sodium bicarbonate is added to make pH value of the solution is 4.5, the reaction temperature is 25° C., and the reaction time is 4 h. After filtration, an aluminum hydroxide-containing precipitate and a rare earth-containing filtrate are obtained respectively. During this process, the precipitation rates of the aluminum and the rare earth are 98.5% and 5.8% respectively.

Embodiment 21

The acid leaching solution obtained from Embodiment 6 is used as a raw material, ammonia water is added to make pH value of the solution is 4.5, the reaction temperature is 30° C., and the reaction time is 8 h. After filtration, an aluminum hydroxide-containing precipitate and a rare earth-containing filtrate are obtained respectively. During this process, the precipitation rates of the aluminum and the rare earth are 98.4% and 2.8% respectively.

Embodiments 22-25 relate to the steps of reacting the aluminum hydroxide-containing precipitate with the sodium hydroxide to obtain the sodium metaaluminate solution.

Embodiment 22

The aluminum hydroxide-containing precipitate obtained from Embodiment 14, which is used as a raw material, reacted with sodium hydroxide, the molar ratio of the added sodium hydroxide to aluminum atoms in precipitate is 1:1, the reaction lasts for 0.5 h at 20° C., after reaction, a sodium metaaluminate solution is obtained through filtration, producing a small amount of by-product aluminum silicon slag. In this process, the conversion rate of the aluminum (calculated by oxide) is 75.6%.

Embodiment 23

The aluminum hydroxide-containing precipitate obtained from embodiment 14, which is used as a raw material, reacted with sodium hydroxide, the molar ratio of the added sodium hydroxide to aluminum atoms in precipitate is 1.5:1, the reaction lasts for 1 h at 50° C., after reaction, a sodium metaaluminate solution is obtained through filtration, producing a small amount of by-product aluminum silicon slag. In this process, the conversion rate of the aluminum (calculated by oxide) is 80.3%.

Embodiment 24

The aluminum hydroxide-containing precipitate obtained from embodiment 14, which is used as a raw material, reacted with sodium hydroxide, the molar ratio of the added sodium hydroxide to aluminum atoms in precipitate is 2:1, the reaction lasts for 4 h at 80° C., after reaction, a sodium metaaluminate solution is obtained through filtration, producing a small amount of by-product aluminum silicon slag. In this process, the conversion rate of the aluminum (calculated by oxide) is 90.1%.

Embodiment 25

The aluminum hydroxide-containing precipitate obtained from embodiment 14 is washed by an aluminum silicon slag washing water (liquid-solid ratio 1.5:1), solid sodium hydroxide is added for reaction, the molar ratio of the sodium hydroxide to aluminum atoms in precipitate is 3:1, the reaction lasts for 8 h at 120° C., after reaction, a sodium metaaluminate solution and aluminum silicon slag are obtained through filtration, wherein the aluminum silicon slag is washed twice against the current with water (liquid solid ratio 2:1). In this process, the conversion rate of the aluminum (calculated by oxide) is 88.6%.

Embodiments 26-36 relate to the steps for preparing a product containing the rare earth with the rare earth-containing filtrate.

Embodiment 26

A rare earth-containing filtrate (calculated by REO) of 8.3 g/L obtained from Embodiment 16 is used as a feed liquid, and an extraction reaction is carried out with the non-saponified P204 as an extractant, wherein the volume content of the P204 in organic phase is 10%, the extraction stage is 6, and the extraction rate of the rare earth is 99.1%; 6-stage countercurrent reverse extraction is performed for the organic phase of load with 4N hydrochloric acid to obtain a rare earth chloride solution, wherein the concentration of the rare earth (calculated by REO) is 208 g/L, and the purity of the rare earth is 99.2%.

Embodiment 27

A rare earth-containing filtrate (calculated by REO) of 9.8 g/L obtained from Embodiment 16 is used as a feed liquid, and an extraction reaction is carried out with the non-saponified P204 as an extractant, wherein the volume content of the P204 in organic phase is 60%, the extraction stage is 4, and the extraction rate of the rare earth is 99.6%; 5-stage countercurrent reverse extraction is performed for the organic phase of load with 3N hydrochloric acid to obtain a rare earth chloride solution, wherein the concentration of the rare earth (calculated by REO) is 165 g/L, and the purity of the rare earth is 99.4%.

Embodiment 28

A rare earth-containing filtrate (calculated by REO) of 10.5 g/L obtained from Embodiment 16 is used as a feed liquid, and an extraction reaction is carried out with the non-saponified P204 as an extractant, wherein the volume content of the P204 in organic phase is 50%, the extraction stage is 4, and the extraction rate of the rare earth is 99.7%; 8-stage countercurrent reverse extraction is performed for the organic phase of load with 6N hydrochloric acid to obtain a rare earth chloride solution, wherein the concentration of the rare earth (calculated by REO) is 275 g/L, and the purity of the rare earth is 99.8%.

Embodiment 29

A rare earth-containing filtrate (calculated by REO) of 8.6 g/L obtained from Embodiment 16 is used as a feed liquid, and an extraction reaction is carried out with the non-saponified P204 as an extractant, wherein the volume content of the P204 in organic phase is 36%, the extraction stage is 8, and the extraction rate of the rare earth is 99.5%; 7-stage countercurrent reverse extraction is performed for the organic phase of load with 5N hydrochloric acid to obtain a rare earth chloride solution, wherein the concentration of the rare earth (calculated by REO) is 236 g/L, and the purity of the rare earth is 99.7%.

Embodiment 30

A rare earth-containing filtrate (calculated by REO) of 5.4 g/L obtained from Embodiment 16 is used as a feed liquid, and an extraction reaction is carried out with the non-saponified P507 as an extractant, wherein the volume content of the P507 in organic phase is 50%, the extraction stage is 6, and the extraction rate of the rare earth is 95.5%; 4-stage countercurrent reverse extraction is performed for the organic phase of load with 2.5N hydrochloric acid to obtain a rare earth chloride solution, wherein the concentration of the rare earth (calculated by REO) is 125 g/L, and the purity of the rare earth is 99.6%.

Embodiment 31

A rare earth-containing filtrate (calculated by REO) of 10.2 g/L obtained from Embodiment 16 is used as a feed liquid, and an extraction reaction is carried out with saponified naphthenic acid as an extractant, wherein the volume content of the naphthenic acid in organic phase is 50%, the extraction stage is 5, and the extraction rate of the rare earth is 99.3%; 3-stage countercurrent reverse extraction is performed for the organic phase of load with 3.5N hydrochloric acid to obtain a rare earth chloride solution, wherein the concentration of the rare earth (calculated by REO) is 182 g/L, and the purity of the rare earth is 99.3%.

Embodiment 32

The rare earth-containing filtrate obtained from Embodiment 16 is used as a raw material, sodium hydroxide is added to make pH value of the solution is 8.0, the reaction temperature is 10° C., and the reaction time is 0.5 h. After filtration, a precipitate containing rare earth hydroxide and a scrap liquid are obtained respectively. The precipitation rate of the rare earth in this process is 96.8%.

Embodiment 33

The rare earth-containing filtrate obtained from Embodiment 16 is used as a raw material, sodium hydroxide is added to make pH value of the solution is 8.5, the reaction temperature is 20° C., and the reaction time is 2 h. After filtration, a precipitate containing rare earth hydroxide and a scrap liquid are obtained respectively. The precipitation rate of the rare earth in this process is 99.0%.

Embodiment 34

The rare earth-containing filtrate obtained from Embodiment 16 is used as a raw material, sodium hydroxide is added to make pH value of the solution is 9.0, the reaction temperature is 40° C., and the reaction time is 4 h. After filtration, a precipitate containing rare earth hydroxide and a scrap liquid are obtained respectively. The precipitation rate of the rare earth in this process is 99.2%.

Embodiment 35

The rare earth-containing filtrate obtained from Embodiment 16 is used as a raw material, sodium carbonate is added to make pH value of the solution is 7.0, the reaction temperature is 25° C., and the reaction time is 1 h. After filtration, a precipitate containing rare earth hydroxide and a scrap liquid are obtained respectively. The precipitation rate of the rare earth in this process is 98.3%.

Embodiment 36

The rare earth-containing filtrate obtained from Embodiment 16 is used as a raw material, ammonia water is added to make pH value of the solution is 8.5, the reaction temperature is 60° C., and the reaction time is 8 h. After filtration, a precipitate containing rare earth hydroxide and a scrap liquid are obtained respectively. The precipitation rate of the rare earth in this process is 98.5%.

Embodiments 37-40 relate to steps of the primary recovery of the aluminum from the rare earth-containing aluminum silicon scrap when the rare earth-containing aluminum silicon scrap has dominant ingredients shown in the table below:

| Ingredient | $Al_2O_3$ | REO | $SiO_2$ | CaO |
| --- | --- | --- | --- | --- |
| Content wt % | 49 | 7 | 15 | 1 |

Embodiment 37

The rare earth-containing aluminum silicon scrap react with sodium hydroxide, the molar ratio of the added sodium hydroxide to aluminum atoms in precipitate is 1:1, the reaction lasts for 0.5 h at 20° C., after reaction, a sodium metaaluminate solution is obtained through filtration. In this process, the conversion rate of the aluminum (calculated by oxide) is 30%.

Embodiment 38

The rare earth-containing aluminum silicon scrap is crushed and ground before the reaction. The rare earth-containing aluminum silicon scrap reacted with sodium hydroxide, the molar ratio of the added sodium hydroxide to aluminum atoms in precipitate is 1.5:1, the reaction lasts for 1 h at 50° C., after reaction, a sodium metaaluminate solution is obtained through filtration. In this process, the conversion rate of the aluminum (calculated by oxide) is 65%.

Embodiment 39

The rare earth-containing aluminum silicon scrap reacted with sodium hydroxide, the molar ratio of the added sodium hydroxide to aluminum atoms in precipitate is 3:1, the reaction lasts for 8 h at 120° C., after reaction, a sodium metaaluminate solution is obtained through filtration. In this process, the conversion rate of the aluminum (calculated by oxide) is 78%.

Embodiment 40

Step 1: The rare earth-containing aluminum silicon scrap is stirred into a slurry with a filter residue washing liquid (liquid solid ratio 1.5:1), and then solid sodium hydroxide is added for reaction, the molar ratio of the sodium hydroxide to aluminum atoms in precipitate is 2:1, the reaction lasts for 4 h at 80° C., after reaction, sodium metaaluminate solution and filter residue are obtained through filtration. The filter residue is washed twice against the current with water (liquid solid ratio 2:1), and in this process, the conversion rate of the aluminum (calculated by oxide) is 80%.

Step 2: The filter residue is stirred into a slurry (liquid-solid ratio 3:1) with silicon-rich slag washing water, 9.5 mol/L hydrochloric acid is added slowly, the pH value during the reaction process is controlled to be 1.0, mechanical agitation (220 rad/min) leaching is performed at 20° C. for 4 h, pH value of the solution at the end of the reaction is controlled to be 0.8; an acid leaching solution containing rare earth and aluminum and a silicon-rich slag are obtained through filtration. The silicon-rich slag is washed twice against the current with water (liquid solid ratio 3.5:1), and leaching rates (all calculated by oxide) of the aluminum, the rare earth and the silicon in the acid leaching solution containing rare earth and aluminum are 82.8%, 96.1%, and 5.8% respectively.

Step 3: 10% sodium hydroxide solution is added to the above acid leaching solution to make t pH value of the solution is 4.5, the reaction temperature is 25° C., and the reaction time is 4 h. After filtration, an aluminum hydroxide-containing precipitate and a rare earth-containing filtrate are obtained respectively. The aluminum hydroxide-containing precipitate is washed twice against the current with water (liquid solid ratio 2:1), the washing liquid is combined with the filtrate, and in this process, the precipitation rates of the aluminum and the rare earth are 99.1% and 3.2% respectively.

Step 4: The above aluminum hydroxide-containing precipitate is stirred into a slurry with an aluminum silicon slag washing water (liquid-solid ratio 1.5:1), reacte with sodium hydroxide, the molar ratio of the added sodium hydroxide to aluminum atoms in precipitate is 2:1, the reaction lasts for 3 h at 80° C., after reaction, a sodium metaaluminate solution and aluminum silicon slag are obtained through filtration, wherein the aluminum silicon slag is washed twice against the current with water (liquid solid ratio 2:1). In this process, the conversion rate of the aluminum (calculated by oxide) is 90.4%, and the purity of the sodium metaaluminate solution was 99.9%.

The above rare earth-containing filtrate (calculated by REO) of 8.5 g/L is used as a feed liquid, and extraction enrichment is carried out with the non-saponified 30% P204 as an extractant, wherein the extraction stage is 6, and the extraction rate of the rare earth is 99.6%; 4-stage counter-current reverse extraction is performed for the organic phase of load with 5N hydrochloric acid to obtain a rare earth chloride solution, wherein the concentration of the rare earth (calculated by REO) is 232 g/L, and the purity of the rare earth is 99.9%.

Embodiment 41

The acid leaching solution obtained from Embodiment 6 is used as a raw material, sodium hydroxide is added such that pH value of the solution is 6.0, the reaction temperature is 10° C., and the reaction time is 0.5 h, after filtering, a mixed precipitate of aluminum hydroxide and rare earth hydroxide is obtained. During this process, the precipitation rates of the aluminum and the rare earth are 99.5% and 89.6% respectively.

Then the mixed precipitate of the aluminum hydroxide and the rare earth hydroxide reacted with sodium hydroxide at 20° C. for 0.5 h when the molar ratio of the sodium hydroxide to the aluminum atoms in the precipitate of aluminum hydroxide is 1:1, to obtain a sodium metaaluminate solution and a precipitate of rare earth hydroxide. In this process, the conversion rate of the aluminum (calculated by oxide) is 75.8%.

Embodiment 42

The acid leaching solution obtained from Embodiment 6 is used as a raw material, sodium hydroxide is added such that pH value of the solution is 7.0, the reaction temperature is 80° C., and the reaction time is 8 h, after filtering, a mixed precipitate of aluminum hydroxide and rare earth hydroxide is obtained. During this process, the precipitation rates of the aluminum and the rare earth are 99.6% and 98.3% respectively.

Then the mixed precipitate of the aluminum hydroxide and r the are earth hydroxide reacted with sodium hydroxide at 80° C. for 4 h when the molar ratio of the sodium hydroxide to the aluminum atoms in the precipitate of aluminum hydroxide is 2:1, to obtain a sodium metaaluminate solution and a precipitate of rare earth hydroxide. In this process, the conversion rate of the aluminum (calculated by oxide) is 80.3%.

Embodiment 43

The acid leaching solution obtained from Embodiment 6 is used as a raw material, sodium hydroxide is added such that pH value of the solution is 9.5, the reaction temperature is 40° C., and the reaction time is 3 h, after filtering, a mixed precipitate of aluminum hydroxide and rare earth hydroxide is obtained. During this process, the precipitation rates of the aluminum and the rare earth are 99.5% and 98.8% respectively.

Then the mixed precipitate of the aluminum hydroxide and the rare earth hydroxide reacted with sodium hydroxide at 120° C. for 8 h when the molar ratio of the sodium hydroxide to the aluminum atoms in the precipitate of aluminum hydroxide is 3:1, to obtain a sodium metaaluminate solution and a precipitate of rare earth hydroxide. In this process, the conversion rate of the aluminum (calculated by oxide) is 81.2%.

Comparison 4

The acid leaching solution obtained from Embodiment 6 is used as a raw material, sodium hydroxide is added such that pH value of the solution is 5.5, the reaction temperature is 8° C., and the reaction time is 9 h, after filtering, a mixed precipitate of aluminum hydroxide and rare earth hydroxide is obtained. During this process, the precipitation rates of the aluminum and the rare earth are 99.1% and 85.1% respectively.

Then the mixed precipitate of the aluminum hydroxide and the rare earth hydroxide reacted with sodium hydroxide at 10° C. for 10 h when the molar ratio of the sodium hydroxide to the aluminum atoms in the precipitate of aluminum hydroxide is 0.9:1, to obtain a sodium metaaluminate solution and a precipitate of rare earth hydroxide. In this process, the conversion rate of the aluminum (calculated by oxide) is 67.9%.

As can be seen from the above description, compared with the method of directly adding excessive sodium hydroxide to the acid leaching solution to form soluble sodium metaaluminate and rare earth concentrates, the above method in the present invention controls the pH value of the acid leaching solution within the range of 3.5~5.2 by adding alkaline substances to the acid leaching solution, such that rare earth ions are still present in the form of ions, while aluminum ions form aluminum hydroxide present in the precipitate. Therefore, a large amount of rare earth-containing filtrate is removed by filtration from the aluminum hydroxide-containing precipitate, i.e., a large amount of aqueous phase solvent is removed by filtration from the acid leaching solution, at this time, reacting the aluminum hydroxide-containing precipitate with sodium hydroxide can greatly reduce the amount of sodium hydroxide used for adjusting pH value of a large amount of aqueous phase, thereby facilitating reduction of the usage amount of sodium hydroxide, reducing the total alkali consumption by more than 80%, and thus greatly reducing the recovery cost.

Similarly, compared with the method of adding inorganic alkali to the acid leaching solution to convert both the rare earth ions and the aluminum ions into precipitates for separation, then reacting the obtained precipitate enrichment with sodium hydroxide, such that the aluminum hydroxide forms soluble sodium metaaluminate, while the rare earth ions remain in the precipitate enrichment, the above method fully precipitates the aluminum ions and the rare earth ions by adjusting pH value when alkaline substances are added to precipitate substances in the acid leaching solution, a large number of aqueous phases in the obtained mixed precipitate of the aluminum hydroxide-containing and the rare earth hydroxide are also filtered out, and as long as the subsequently added the sodium hydroxide reacted with the aluminum hydroxide herein, sodium metaaluminate solution can be generated, thereby the usage amount of the sodium hydroxide is further reduced, the total alkali consumption can be reduced by more than 85%, and the cost of recovery is greatly reduced.

The above is merely the preferred Embodiments of the present invention, and is not used to define the present invention. For the person skilled in the art, the present invention may have various changes and variations. Any modification, equivalent substitution, amendment, etc. made within the spirit and principle of the present invention shall be included in the scope of protection of the present invention.

What is claimed is:

1. A method of recovering and reusing rare earth, aluminum and silicon from a rare earth-containing aluminum silicon scrap, wherein the method comprises steps of:
    S1, acid-leaching the rare earth-containing aluminum silicon scrap with an inorganic acid aqueous solution, to obtain a silicon-rich slag and an acid leaching solution containing rare earth and aluminum elements;
    S2, adding an alkaline substance to the acid leaching solution containing rare earth and aluminum elements, controlling an end-point pH value of the acid leaching solution between 3.5 and 5.2 to obtain a slurry, and performing solid-liquid separation for the slurry to obtain an aluminum hydroxide-containing precipitate and a rare earth-containing filtrate; and
    S3, reacting the aluminum hydroxide-containing precipitate with sodium hydroxide to obtain a sodium metaaluminate solution and an aluminum silicon slag, and preparing a rare earth compound product with the rare earth-containing filtrate.

2. The method according to claim 1, wherein in the step S1, a pH value during reaction is controlled to be 0.1~2.5.

3. The method according to claim 1, wherein in the step S1, a temperature of the acid-leaching is 10~80° C., and an end-point pH value of the acid leaching solution containing rare earth and aluminum obtained is 0.5~2.0.

4. The method according to claim 3, wherein in the step S1, the inorganic acid aqueous solution is sulfuric acid solution, hydrochloric acid solution or nitric acid solution.

5. The method according to claim 1, wherein in the step S2, the alkaline substance is added to the acid leaching solution containing rare earth and aluminum in the manner of stirring to perform a precipitation reaction, the precipitation reaction lasts for 0.5~8 hours at 10~60° C., and the end-point pH value of the precipitation reaction is 4.0~4.8.

6. The method according to claim 1, wherein in the step S3, a molar ratio of the sodium hydroxide added to aluminum atoms in the aluminum hydroxide-containing precipitate is 1:1~3:1; and the aluminum hydroxide-containing precipitate is reacted with the sodium hydroxide at 20~120° C. for 0.5~8 hours.

7. The method according to claim 1, wherein in the step S3, preparing the rare earth compound product with the rare earth-containing filtrate comprises:
  performing extraction-separation for the rare earth-containing filtrate to obtain a rare earth-carried organic phase and a raffinate;
  performing reverse extraction for the rare earth-carried organic phase with hydrochloric acid or nitric acid to obtain a chloride rare earth solution or a nitric acid rare earth solution; or
  adding the alkaline substance to the rare earth-containing filtrate, and controlling a pH value of the rare earth-containing filtrate to be 6.0~9.5 to obtain a rare earth precipitate and a scrap liquid.

8. The method according to claim 7, wherein an extractant used in the extraction-separation is P507, P204, or a naphthenic acid; the extractant is diluted with a diluent, and a volume content of the extractant in the extractant diluted is 10~60%.

9. The method according to claim 7, wherein adding the alkaline substance to the rare earth-containing filtrate in a manner of stirring at a temperature of 10~60° C. to react for 0.5~8 hours, and controlling the pH value of the rare earth-containing filtrate to be 7.0~9.0 to obtain the rare earth precipitate and the scrap liquid.

10. The method according to claim 1, wherein the alkaline substance is one or more of an organic alkaline substance or an inorganic alkaline substance; the inorganic alkaline substance is a soluble carbonate, a soluble bicarbonate, a soluble hydroxide or an ammonia water.

11. The method according to claim 10, wherein the inorganic alkaline substance is at least one of sodium hydroxide, sodium carbonate and sodium bicarbonate.

12. The method according to claim 1, wherein when a mass ratio of aluminum to silicon is more than 1:1 in the rare earth-containing aluminum silicon scrap, a step of primary recovery of aluminum in the rare earth-containing aluminum silicon scrap is added before the step S1, and the step of primary recovery comprises: reacting the rare earth-containing aluminum silicon scrap with sodium hydroxide, performing solid-liquid separation to obtain a sodium metaaluminate solution and the rare earth-containing aluminum silicon scrap after the primary recovery of aluminum.

13. The method according to claim 12, wherein a molar ratio of the sodium hydroxide to aluminum atoms in the rare earth-containing aluminum silicon scrap is 1:1~3:1 for reacting the rare earth-containing aluminum silicon scrap with sodium hydroxide at 20~120° C. for 0.5~8 hours.

14. A method of recovering rare earth, aluminum and silicon from rare earth-containing aluminum silicon scrap, wherein the method comprises:
  S1, acid-leaching the rare earth-containing aluminum silicon scrap with an inorganic acid aqueous solution, to obtain a silicon-rich slag and an acid leaching solution containing rare earth and aluminum elements;
  S2, adding an alkaline substance to the acid leaching solution containing rare earth and aluminum elements, controlling an end-point pH value of the acid leaching solution between 6.0 and 9.5 to obtain a mixed precipitate of rare earth hydroxide and aluminum hydroxide after filtering; and
  S3, reacting the mixed precipitate of rare earth hydroxide and aluminum hydroxide with sodium hydroxide to obtain a sodium metaaluminate solution and a rare earth hydroxide precipitate.

15. The method according to claim 14, wherein in the step S1, a pH value during reaction is controlled to be 0.1~2.5.

16. The method according to claim 14, wherein in the step S1, a temperature of the acid-leaching is 10~80° C., and an end-point pH value of the acid leaching solution containing rare earth and aluminum obtained is 0.5~2.0.

17. The method according to claim 16, wherein in the step S1, the inorganic acid aqueous solution is sulfuric acid solution, hydrochloric acid solution or nitric acid solution.

18. The method according to claim 14, wherein in the step S2, adding the alkaline substance to the acid leaching solution containing rare earth and aluminum elements in the manner of stirring at a temperature of 10~60° C. to react for 0.5~8 hours, controlling the end-point pH value of the acid leaching solution between 7.0 and 9.0.

19. The method according to claim 14, wherein the alkaline substance is one or more of an organic alkaline substance or an inorganic alkaline substance; the inorganic alkaline substance is a soluble carbonate, a soluble bicarbonate, a soluble hydroxide or an ammonia water.

20. The method according to claim 19, wherein the inorganic alkaline substance is at least one of sodium hydroxide, sodium carbonate, and sodium bicarbonate.

21. The method according to claim 14, wherein in the step S3, a molar ratio of the sodium hydroxide added to aluminum atoms in the aluminum hydroxide-containing precipitate is 1:1—3:1; and the aluminum hydroxide-containing precipitate is reacted with the sodium hydroxide at 20~120° C. for 0.5~8 hours.

22. The method according to claim 14, wherein in the step S3, the rare earth hydroxide precipitate is dissolved by hydrochloric acid, nitric acid, or sulfuric acid to obtain a rare earth salt solution.

23. The method according to claim 14, wherein when a mass ratio of aluminum to silicon is more than 1:1 in the rare earth-containing aluminum silicon scrap, a step of primary recovery of aluminum in the rare earth-containing aluminum silicon scrap occurs before the step S1, and the step of primary recovery comprises: reacting the rare earth-containing aluminum silicon scrap with sodium hydroxide, performing solid-liquid separation to a obtain sodium metaaluminate solution and the rare earth-containing aluminum silicon scrap after the primary recovery of aluminum.

24. The method according to claim 23, wherein in the step of primary recovery, a molar ratio of the sodium hydroxide to aluminum atoms in the rare earth-containing aluminum silicon scrap is 1:1~3:1, and the rare earth-containing aluminum silicon scrap is reacted with the sodium hydroxide at 20~120° C. for 0.5~8 hours.

25. The method according to claim 22, wherein extraction and purification is performed for the rare earth salt solution.

* * * * *